Aug. 4, 1942.                F. NELL                 2,291,744
                    THREAD CUTTING MECHANISM
              Filed Aug. 2, 1940          2 Sheets-Sheet 1
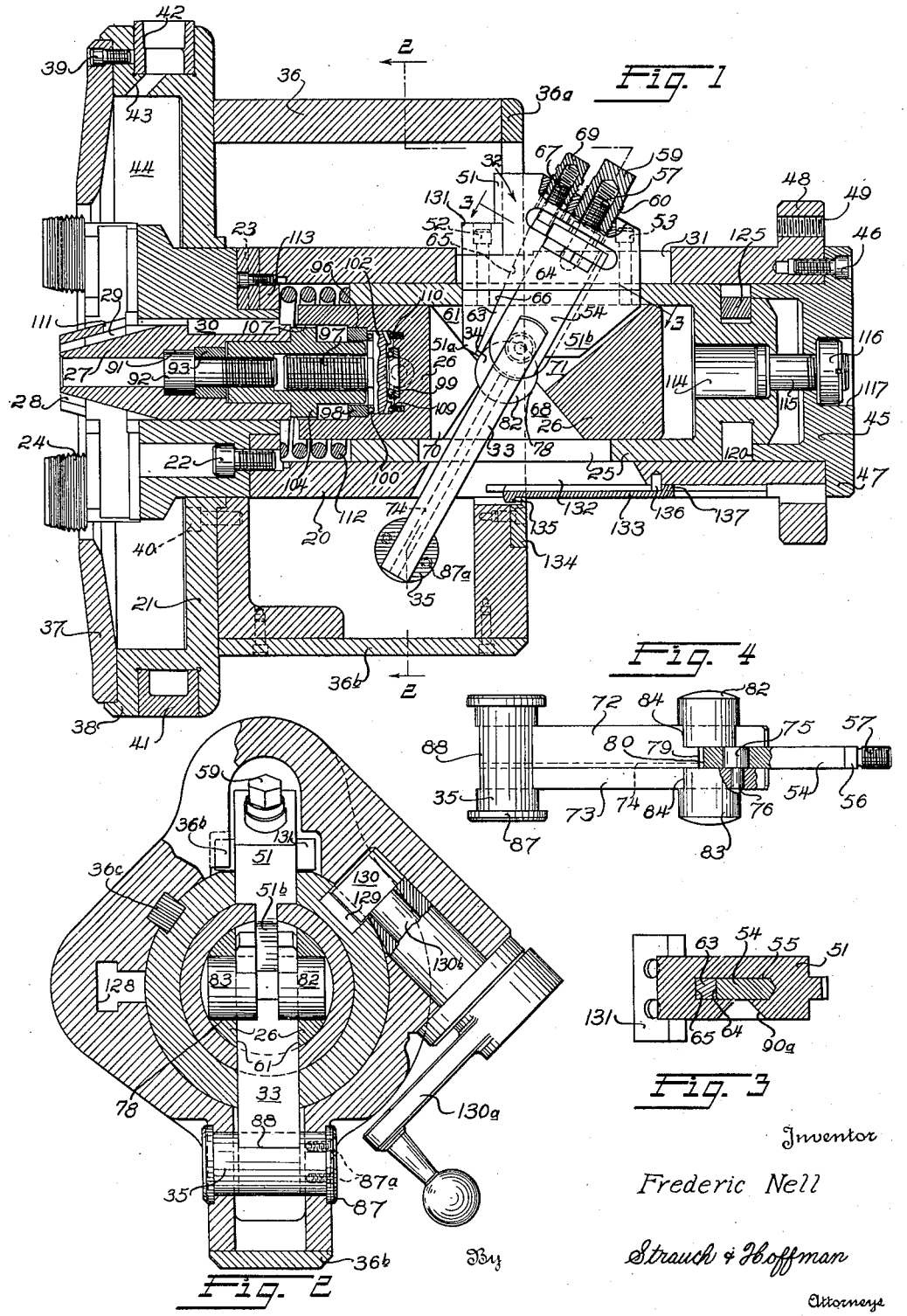
Inventor
Frederic Nell
By Strauch & Hoffman
Attorneys

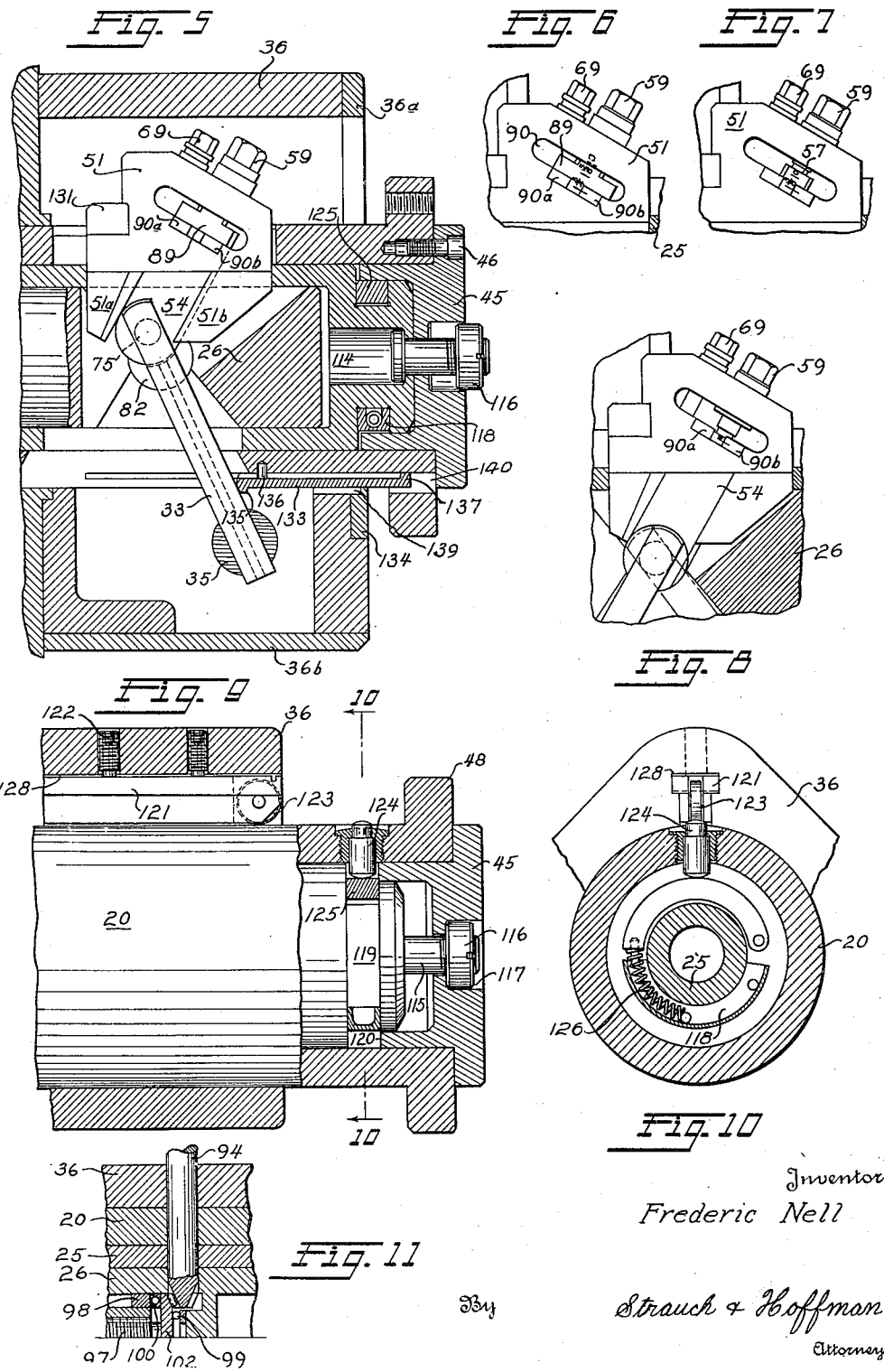

Patented Aug. 4, 1942

2,291,744

UNITED STATES PATENT OFFICE 2,291,744

THREAD CUTTING MECHANISM

Frederic Nell, Waynesboro, Pa., assignor to Landis Machine Company, Waynesboro, Pa., a corporation of Pennsylvania Application August 2, 1940, Serial No. 349,868

28 Claims. (Cl. 10—145)

This invention relates to a thread cutting machine of the type wherein the threading elements are caused to have radial movement, during thread cutting action, to produce a tapered thread, and in which the cutting elements are, at the conclusion of the threading operation, rapidly retracted from the work to permit the ready withdrawal of the mechanism away from the threaded object. Specifically, the machine embodies a lever mechanism, actuated in accordance with the threading operation, to gradually effect retraction of the threading elements and cause them to cut a tapered thread.

Although threading machines of this general character are disclosed in the prior art, as for instance British Patent No. 343,834, dated February 26, 1931, the United States Patent to Drissner No. 2,024,278, granted December 17, 1935, those constructions are open to the objections that they are not sufficiently accurate or flexible to satisfy present day requirements; they do not provide sufficiently large taper ranges, nor can the taper changes be made by small increments; and what is more serious, the taper of those constructions cannot be changed in any respect without also unavoidably varying the diametrical size adjustment, with the result that every change in taper usually must be followed by a compensating size adjustment. In other words, practically every time a change in the taper is desired, two separate and distinct adjustments must be carried out. The prior art constructions are also objectionable from the standpoints of cost, and complexity, they possess inherent difficulties incident to adjusting and servicing, and they often fail or the parts thereof become so distorted as to impair their accuracy under the stresses to which they are subjected in service.

It is accordingly the major object of this invention to provide a novel threading machine for cutting tapered threads on either internal or external work, which overcomes all of the objections of the prior art constructions just discussed; is of simple efficient design; low in cost and sufficiently rugged to stand up under severe stresses in service.

Another important object is to provide a threading machine having a lever mechanism for retracting the cutters and causing them to cut a tapered thread during the threading operation, and to so mount the lever that the fulcrum point may be adjusted by small increments over a large range of tapers.

A further object is to provide a threading machine that may be adjusted by small increments over a large range to cut threads having zero taper to the largest taper the machine is capable of handling.

Another object is to provide a threading machine having a lever mechanism for effecting retraction of the cutters during threading, so as to produce a tapered thread, and to so mount the fulcrum of the lever that it may be changed to vary the rate of taper without varying the diametrical size adjustment of the machine.

A still further object is to provide a lever action tapered thread cutting machine having novel sealing means for guarding against the entry of foreign matter into the mechanism, thereby prolonging the life of the working parts.

Another object is to provide a lever action tapered thread cutting machine providing a receding action entirely independent of forces exerted on the retracting or collapsing mechanism, so that unusual smoothness of operation is realized and superior threads produced.

Another object is to provide an improved diametrical adjustment mechanism for threading machines which is positive in its action, is self locking, and makes it possible to carry out the adjusting operation without dismantling any parts of the machine.

Additional objects of a more subordinate nature are to provide a tapered thread cutting mechanism embodying novel means for keying the collapsing mechanism to the head body; improved large area bearing surfaces for all of the parts of the taper train; a novel lever fulcrum adjusting device embodying means for rigidly wedging the parts in adjusted position; and other improvements which will become apparent as the specification proceeds in connection with the annexed drawings, and from the appended claims.

In the drawings,

Figure 1 is a vertical longitudinal cross-sectional view through a collapsible tap embodying my invention, the parts of the tap being shown in thread cutting position;

Figure 2 is a transverse cross-section, taken substantially along line 2—2 of Figure 1;

Figure 3 is a cross-sectional view of the lever support taken along line 3—3 of Figure 1;

Figure 4 is an auxiliary view showing the lever pivoted to the supporting slider and associated with the cam members, with the parts removed from the machine.

Figure 5 is a longitudinal cross-section similar to that shown in Figure 1, but shows the tap in collapsed or non-threading position;

Figures 6, 7 and 8, respectively, show the mechanism in adjusted condition for threading ¾" included taper per foot, ⅜" included taper per foot, and for threading straight or non-tapered threads;

Figure 9 is a longitudinal sectional view showing details of the tripping mechanism and the latching mechanism;

Figure 10 is a transverse sectional view, taken along line 10—10 of Figure 9, showing further details of the tripping and latching mechanisms, and Figure 11 is a fragmental longitudinal sectional view showing the manner in which the diametrical adjustment is carried out.

Referring now to the drawings, wherein similar reference characters have been employed to designate like parts throughout the several views, and referring more particularly to Figures 1, 2, 3 and 4, the broad structural and functional characteristics of my improved threading machine first will be described, followed by a detailed description of the component units thereof.

A main body portion 20 has secured detachably thereto a head member 21 by means of bolts 22 and key 23, the latter preventing relative rotation between the detachable head and the body. Chaser assemblies 24 are mounted for radial movement in head 21 by means of suitable T-shaped slots located within the head, and they are actuated in a manner to be hereinafter pointed out.

A collapsing sleeve 25 is slidably fitted within the body 20 and carries a reciprocating plunger member 26. Secured to one end of the plunger 26 is a chaser controlling cam 27 provided with inclined cam grooves 28 into which are received camming wings 29 of the chaser assemblies 24. Cam member 27 is provided with a key 30 which engages the head 21 and secures the cam against rotation.

Extending through an elongated slot 31 in body 20, and secured to the sleeve member 25, is a pivot assembly 32 which carries a pivoted lever 33 on the lower end thereof. The lever 33 is adapted to slide through a split or two-part camming trunnion assembly 34 which is rotatably secured to the plunger 26; and further is adapted to slide through a single somewhat similar camming trunnion 35 but which is made in one piece and rotatably secured to a control collar assembly 36, to be hereinafter more fully described.

Control collar assembly 36 is mounted for longitudinal sliding movement on the outer cylindrical surface of body 20, and the reciprocating movement thereof is utilized to actuate the lever 33 and effect proportional reciprocating movement of plunger 26. This results in producing a perfect taper, as will readily be understood hereinafter. The control collar is restrained against rotation on the body by means of a key 36c.

The control collar is actuated by means of the engagement of a work contacting ring 37 with the end of the object being threaded. This ring is attached to an oil shroud 38 by means of bolts 39; and the oil shroud 38 is in turn attached to collar 36 by means of bolts 40. Mounted in oil shroud 38 is an oil receiving ring 41, adapted to receive oil through the fitting inserted in a recess 42 and delivering oil through a plurality of ducts 43 to the oil chamber 44 of oil shroud 38. The oil or cutting coolant is directed over the chasers 24 by means of suitable recesses provided in work engaging ring 37 (not shown).

The rear end of the tap is provided with an adaptor element 45, which is secured to the body by screws 46 and is provided with a locating and centering boss 47 adapted to be received in a corresponding recess on the machine on which the device is assembled. To further secure the tap to such a machine, the body is provided with a rear flanged portion 48 having a plurality of threaded bores 49 adapted to receive suitable attaching bolts.

The tap is secured to the machine in well known manner and rotated and advanced onto the work, the latter being stationarily gripped in any suitable work holding device. As the threading operation proceeds, chasers 24 cut an internal thread in the pipe or other article of work, and the latter arrests collar assembly 36, so as to produce relative movement between it and body 20. The collar, acting through lever 33, retards forward movement of plunger 26 and causes the chasers to be moved inwardly and cut a tapered thread. When the collar has been moved to a predetermined position, it trips a latch and causes the chasers to be rapidly withdrawn from the work.

The component units of the machine will now be described in detail.

Receding mechanism

During the threading operation, collapsing sleeve 25 is held rigidly in the position shown in Figure 1, by a mechanism which will be described later, and plunger 26 is caused to recede or move rearwardly within the sleeve 25, carrying therewith cam member 27, which, in turn, draws the chasers 24 radially inwardly of the head 21 and thereby effects the tapering of the threading cut. To permit of such rearward movement of the plunger, a recess is located to the rear thereof in sleeve 25.

The means for effecting such rearward movement of the plunger 26 will now be described in detail. As has been mentioned before, the pivot assembly 32 is fastened to the sleeve member 25 and extends through a longitudinal slot 31 provided in head body 20. This assembly comprises a lever support 51 rigidly secured to sleeve 25 by means of screws 52 and 53. Within support 51 is a slidably mounted pivot member or slide 54, one of whose sides is V-shaped so as to make the member more rigid and to centralize it within a correspondingly shaped guideway or slot 55 in frame 51. As seen in Figure 2, frame 51 has reduced thickness finger portions 51a and 51b which extend through a slot in the upper side of sleeve 25.

Slide 54 has a reduced upper end 56 and a further reduced threaded section 57 which coacts with a similarly threaded section of an adjusting nut 59. Nut 59, in turn, has a cylindrical lower section bearing external threads 60, which coact with threads located within a coacting bore of support 51. By having the external threads of nut 59 of a different hand than the internal threads, a very rapid means for effecting adjustments of the pivot member 54, with respect to the frame 51, is obtained. If desired, however, they may be of the same hand but of different pitch.

To retain the pivot member in adjusted position, a locking wedge 63, which coacts with the guideway and the pivot member so as to exert a binding action on the latter, is utilized. The wedge has a surface 64 bearing against the pivot member 54 and a second bearing surface 65, inclined with respect to the bearing surface 64, which coacts with the similarly inclined surface 66 of the support 51. The wedge also has a reduced upper section 67 to which is threaded a locking nut 69. Nut 69, in turn, is threadedly connected to the frame 51 by external threads The two sets of threads of nut 69 are preferably of different hands, so that, in addition to obtaining a very rapid locking action, an inherently strong camming action is secured which virtually makes any undesired movement of the pivot member 54 impossible, and which causes the entire assembly to be extremely rigid. Such rigidity is highly desirable in view of the fact that the mechanism is designed for the cutting of extremely accurate threads, and any distortion of the fulcrum point of the lever will be reflected as inaccuracies in the threads.

The novel lever supporting and adjusting mechanism just described provides efficient support for, and is so related to, the lever mechanism which will now be described that the taper may be changed without varying the diametrical setting of the head.

Lever 33 comprises two longitudinal sections 72 and 73 which are keyed together by means of the longitudinal rib or key 74 located on section 73. Section 72 is provided at its upper end with an integral pivot 75 having thereon a reduced end 76 fitting into a coacting bore in lever section 73, section 72 being recessed so that the lever is forked. It is obvious that by inserting pivot 75 of lever section 72 into the pivot bore of slide member 54, and then fusing or sweating the lever section 73 into firm contact with the lever section 72, an exceedingly strong and rigid pivot member and lever member assembly is secured, for the pivot 75 forms an integral part of the lever 33, instead of merely being pinned thereto as would customarily be done. The lever and the pivot member are joined in such manner as to have a peripheral clearance 79 between a cylindrical surface 80 of the pivot member 54 and the bottom of the bifurcated portion provided on the end of lever 33, so that the latter is perfectly free to rotate about the center of the pivot 75 through a large angle.

Lever 33 is accordingly mounted for free pivotal movement on slide 54. Camming assembly 34 cooperates to apply forces to plunger 26 closely adjacent pivot point 75, so in order to allow the action to take place and yet avoid small bearing areas camming assembly 34 is preferably made up of a pair of slotted trunnions 82 and 83 journalled in opposite ends of a bore 78 in plunger 26 as seen more clearly in Figure 2.

Members 82 and 83 are of cylindrical shape and are slotted at 84 to freely slide on lever 33. Slots 84 are of a depth to prevent members 82 and 83 from striking member 54 as they slide back and forth on lever 33. Members 82 and 83 are journalled in plunger 26 and have ball shaped ends which ride in sliding engagement with the interior of sleeve 25. This construction makes it possible to adjust slide 54 so that the center of pivot 75 coincides with the center of the camming element.

Collar 36 has rotatably mounted therein a camming element 35 which is provided with a removable end flange 87 secured in place by countersunk screws 87a and the parts are fitted so as to prevent any side play. Lever 33 has sliding contact with a substantially rectangular recess 88 in element 35. Elements 35, 82 and 83 have pivotal contact with the machine parts but purely sliding movement with the lever, and they will be hereinafter referred to as camming elements.

Lever 33 accordingly has pivotal contact with sleeve 25 and camming contact with both the plunger 26 and the collar 36. Further, as the collar 36 moves rearwardly, due to the engagement of its work contacting ring 37 with the object being threaded, the controlled rearward movement thereof produces a similarly controlled proportionate rearward movement of plunger 26, the movement being proportional to the ratio of the distance between the centers of pivot 75 and bore 78 (the axis of the camming elements 82 and 83) to the distance between the centers of pivot 75 and of the camming element 35. Because the parts move in parallel paths, and similar triangles always are involved, this ratio remains the same regardless of the angular position of the lever 33, being altered only when an adjustment of the pivot member 54 is effected to provide a different taper. In other words, when lever 33 assumes an inclination so as to increase the distance between the centers of pivot 75 and bore 78, the distance between pivot 78 and trunnion 35 is proportionately increased, thereby maintaining the ratio between the two lever arms constant, in all angular positions of the lever. Plunger 26 is provided with wide recesses 61 and 68 so as to permit swinging or rotary movement of the lever 33 therewithin, and narrower recesses 70 and 71 to permit slide 54 and its support to move longitudinally.

It should further be noted that when the collar 36 is in its frontmost or initial position, taper adjustments may be effected without causing any movement of the plunger relative to the tap body, because as seen in Figure 1, the pivot point 75 and camming points 34 and 35 lie in a common line, and the direction of adjustment of the pivot member 54 is directly in line with the axis of the lever 33. Consequently, it is possible to effect any desired taper change without in any way effecting the diametrical position of the chasers, because slide 54 may be moved in either direction without effecting movement of plunger 26. This has been impossible in any constructions heretofore available.

To facilitate gauging the taper adjustments, the reduced end 56 of pivot member 54 is provided with a graduated plate 89 which is more clearly shown in Figures 6, 7 and 8. Also, support 51 is provided with a suitable recess 90 which permits observations of the indicia of plate 89 and it also has bevel sides 90a and 90b. Side 90b carries a zero mark to be used in conjunction with indicia on plate 89 to show the setting of the slide. It should be noted that Figures 6, 7 and 8 show the structure in position for cutting ¾", ⅜", and zero included taper per foot, respectively. These particular values are most common; however, the graduations need not be confined thereto and any number of other tapers located between these values may be indicated on plate 89. With regard to the latter taper, as has been mentioned before, when the center of the pivot 75 coincides with the center of the camming assembly 34 (comprising members 82 and 83), movement of the collar has no effect on the position of the plunger; consequently, a straight thread may be produced with the assembly just as readily as can a tapered one, and this feature renders the machine extremely flexible because it provides a straight cutting and taper cutting machine in one.

From the foregoing discussion of my receding mechanism, it is evident that I have developed a novel taper train which is superior to any prior ones by virtue of its greater flexibility, its greater rigidity, its greater durability, and its adaptability to be used in conjunction with a taper adjustment mechanism which is capable of effecting major taper changes by infinitely small increments and without any possible undesired accompanying cutting diameter variation—all of which is novel and very advantageous.

Size adjustment mechanism

As previously stated, chaser cam 27 is secured to plunger 26. The nature of this connection which is axially extensible so as to provide a plurality of axial displacements of cam 27 with respect to plunger 26, and which is also useful in other types of thread cutting mechanisms, will now be described in detail.

Cam 27 has a counterbored recess 91 which is adapted to receive the cylindrical head of bolt member 92. To retain bolt 92 within recess 91, an annular ring member 93 is pressed into a counterbore of cam 27. Consequently, while it is possible to rotate bolt 92 by inserting a suitable wrench through the bore 95 of cam 27, it is restrained from any axial movement.

Plunger 26 has a counterbored recess 96 which is adapted to receive an adjusting member 97, which is retained in recess 96 by an annular ring 98. Adjusting member 97 preferably has associated therewith thrust bearings 99 and 100. Member 97 has a head providing a serrated conical end 102 which is adapted to be engaged by a serrated conical-ended adjusting wrench 94 that enters the tap structure through openings in the collar, the body, the sleeve and the plunger, which align when the parts are in the position shown in Figures 1 and 11. It is obvious that adjusting member 97 may thus be caused to rotate relative to the plunger 26; however, no relative axial movement therebetween is possible.

The means for connecting these two previously described assemblies comprises a sleeve-like connector member 104 having a threaded bore coacting with bolt 92 and a second axially aligned threaded bore coacting with adjusting member 97. Member 104 has a splined surface 107 coacting with the cooperatingly splined bore located in plunger 26; consequently, it is secured against any relative rotation; however, it is free to experience axial displacements.

Accordingly, rotation of adjusting member 97 will result in moving splined member 104 axially forwardly or rearwardly, depending upon the direction of rotation. Axial movement of member 104 normally produces a corresponding axial displacement of cam 27, for these two members are held in firm contact by the bolt 92. Consequently, the chasers 24 are caused to assume new radial positions and establish a new cutting diameter. It should be observed that, during the adjusting operation, no movement of any of the other parts occurs.

To guard against possible undesired rotation of adjusting member 97, such as would affect the cutting diameter, a pair of peripherally spaced spring pressed ball detents 109 and 110 are incorporated into the plunger 26 and are adapted to coact with the serrated section 102 of adjusting member 97. By properly spacing detents 109 and 110, it is possible to have one contacting the crest and the other the root of spaced serrations on the serrated surface 102; thus, rotations of adjusting member 97 can be effected by very small increments, which enables fine diametrical size adjustments to be carried out.

When it is desired to remove the chasers 24 for replacing or resharpening, bolt 92 is rotated so as to move cam 27 forwardly away from its contact with member 104. After cam 27 has experienced a sufficient forward displacement, the camming wings 111 of cam 27, which are relieved at their rear ends, have lost their engagement with the camming wings 29 of chasers 24, and the latter can be withdrawn. Similarly, when the chasers are replaced in the head 21, they engage the bottoms of grooves 28, which engagement stops them all in the proper position to be picked up by camming wings 111. With the chasers engaging the bottoms of grooves 28, backward movement of cam 27 to its original position results in simultaneous engagement of the chasers with wings 111, and in returning them to their former cutting diameter, because where bolt 92 is pulled up tight cam member 27 is pulled into abutment with the shoulder on connector 104.

Summarizing, the novel diametrical adjustment mechanism is very compact and virtually perfectly sealed against the entry of foreign matter. Further, it employs a very sensitive detent arrangement which permits of coarser spacing of the coacting serrations and without a consequent loss of adjustment sensitivity. Finally, the parts are relatively small, but the arrangement thereof makes the assembly very durable and trouble-free.

Collapsing and associated mechanisms

Referring to Figures 1, 5, 9 and 10, the collapsing sleeve 25 is constantly subjected to the rearward thrust of a collapsing spring 112 which surrounds the forward end of plunger 26 and abuts a flange 113 on body 20. Sleeve 25 is keyed against rotary movement by the keying action of pivot support 51, which is fastened thereto and which coacts in sliding contact with the side walls of elongated slot 31 of body 20. This, eliminates the necessity for a separate keying member.

The rear end of sleeve 25 has a recess 114 in which is located the head of a restraining bolt 115; the other end of this bolt coacts with a nut 116 seating in a recess 117 of adapter 45. While this connection does not in any way hinder rearward movement of sleeve 25 under the influence of spring 112, it effectively prevents the sleeve 25 from moving forwardly beyond the engagement of the head of retaining bolt 115 with sleeve recess 114.

Sleeve 25 is provided with a latch mechanism for maintaining it in its forward thread cutting position against the action of spring 112, comprising a curved latch member 125 pivoted in a groove 119 in the rear end of sleeve 25 and cooperating with a latching face 120 provided on adapter 45. The latch is urged into the locking position shown in Figures 1, 9 and 10 by means of a compression spring 126 carried by a retainer 118 secured in groove 119.

The latch is actuated by a plunger 124 carried in a retaining bushing in the rear end of body 20, and by depressing it latch 125 may be pivoted inwardly to clear latch face 120 and allow spring 112 to move sleeve 25 into the position shown in Figure 5. Plunger 124 is automatically depressed and the latch tripped after a predetermined length of thread has been cut by the device now to be described.

The control collar is formed on its under side with a T-shaped slot 128 which receives a graduated length bar 121, held in adjusted position by binding screws 122, and having a roller 123 journaled in its outer end and which cooperates with plunger 124. By loosening screws 122, the bar 121 may be adjusted longitudinally of collar 36 to lengthen or shorten the amount of required travel of collar 36 to trip the tap.

When collar 36 has moved sufficiently rearward to contact roller 123 with trip plunger 124, the latch is pressed inwardly, thus moving it off of seating engagement with latch surface 120 of adapter 45. When latch piece 125 has fully been depressed by trip plunger 124, as just described, collapsing spring 112 rapidly projects the sleeve 25 rearwardly, the rear extension thereof fitting snugly within adapter 45, as seen in Figure 5.

This rearward movement of sleeve 25 naturally carries the pivot assembly 32 attached thereto rearwardly, also. However, since the work engaging ring 37 still remains in abutment with the work, camming element 35 experiences no axial movement other than the slight relative threading travel between the work and the tap. Consequently, camming element 34 is rapidly drawn rearwardly, although not quite so rapidly as is the pivot assembly 32. The rapid rearward movement of element 34 and of associated plunger 26 results in drawing the chasers inwardly and out of engagement with the work, and the latter accordingly may be removed and replaced by another piece.

Resetting mechanism

If the tap is used in a vertical position, the weight of collar 36 is insufficient to compress spring 112 sufficiently to permit latch 125 to again lock against latch seat 120 after the head is collapsed; therefore, a rack 129 is fastened to the body 20, and collar 36 is provided with a hand actuated pinion gearing arrangement comprising a pinion 130 and hand crank 130a mounted on a shaft 130b. By turning the crank, collar 36 is moved forwardly, and a rear cover plate 36a contacts a lug 131 provided on support 51 and thereby "picks up", and causes sleeve 25 to be moved forwardly against the force of spring 112. When latching occurs, the parts are arrested and no further forward movement of collar 36 is possible due to the action of restraining bolt 115. During forward travel of collar 36 and plunger 26, the chasers are cammed out to threading position.

Seal plate assembly

The lower part of collar 36 is closed by a plate 36b, which excludes extraneous matter from the interior. The large downwardly facing slot 132 in body 20, through which lever 33 projects, is sealed at all times by a novel sealing assembly, which will now be described.

A cover plate 133 is slidable in guideways longitudinally on body 20, and engageable by lever 33 to move it rearwardly during the threading operation. Collar 36 has mounted therein a catch plate 134 which, when the tap is reset, engages a ledge 135 on cover plate 133 and pulls it forwardly so as to again seal slot 132. A pin 136 in body 20 limits the forward movement of the plate 133 by contacting an inturned edge 137 thereof. This sealing arrangement in no way lengthens the tap structure, because both collar 36 and body 20 are recessed at 139 and 140, respectively, to accommodate the cover plate when the parts are in the collapsed position shown in Figure 5.

From the foregoing description of my threading machine, it is evident that the novel taper mechanism has a very large range; the working parts of the taper train have large bearing areas and are ruggedly designed; the associated taper adjustment mechanism is capable of changing the taper by infinitely small increments from zero taper to the largest taper of the machine, and without any accompanying change in the diametrical setting of the cutters; the sealing means is so designed as to enable the length of the construction to be held to a minimum; the design of the machine has made it possible to incorporate the improved tripping, latching, sleeve restraining, and other mechanisms disclosed in my copending application Serial No. 173,711 therein and in such manner as to make the assembly more compact than that of the said copending application. Also, the machine embodies an improved keying arrangement for the collapsing sleeve; a novel rigid lever pivot assembly; a taper train having exceptionally large camming faces, improved and novel diametrical adjustment means, and novel arrangements of mechanisms so as to obtain the most compact structure known to me.

It should be evident that simple reversals of certain of the parts would effect a change of my machine from the disclosed taper tap structure to a taper die head; consequently, I do not limit myself to a tap, and certain of the appended claims are therefore intended to cover the invention when embodied in a tap or die.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A threading machine comprising a body; a plurality of thread forming elements mounted for movement on said body; a hollow member mounted in said body and normally immovable with respect thereto; a lever; a support carried by said member and projecting therein; means pivotally mounting said lever upon said support for rocking movement about an axis located within said member; controlling means for said forming elements slidably mounted in said member and having camming contact with said lever and having a recess receiving said support; and means carried by said body for imparting rotary movement to said lever to effect controlled radial movement of said thread forming elements during the threading operation.

2. The threading machine as set forth in claim 2, wherein said means for imparting rotary movement to said lever comprises a member slidably mounted on said body and having camming contact with said lever.

3. In a threading machine, a head body; a member carried by said body and normally stationary with respect to said body during thread cutting; a pair of elements mounted for relative parallel sliding movement on said body; a lever pivotally connected to said member and having camming engagement with said elements; the pivotal axis of said lever and the effective centers of camming engagement of said lever with said elements being disposed in rectilinear alignment, and means for adjusting the pivot point of said lever on said member in such direction as to vary the camming action of said lever without effecting relative movement of said elements.

4. In a threading machine, a head body, an element carried by said body and normally stationary during threading; a pair of further elements carried by said body and mounted for relative sliding movement in parallel paths; a lever pivotally connected to one of said elements and having camming engagement with the other of said elements; and means for adjusting the pivot point of said lever with respect to said one element by small increments in a direction exactly parallel to the effective centers of camming engagement of said lever with said other elements when said lever is in thread cutting position, whereby the lever arm ratios of said lever may be varied without producing relative movement of said elements.

5. In a threading machine, a head body having inwardly and outwardly movable thread cutters; a longitudinally movable element for actuating said cutters; a longitudinally movable element actuated in accordance with threading of the work; a third element carried by said body and normally stationary during the thread cutting operation; a lever pivotally connected to one of said elements and having camming engagement with the other two elements for effecting a controlled retraction of said cutters in response to movement of said second-named element, said lever being adapted to assume a predetermined position when said thread cutters are in initial thread cutting position; and means for adjusting the pivot point of said lever on said one element in a direction exactly parallel to a line containing the effective centers of camming engagement of said lever with said other two elements when said lever is in said predetermined position, for varying the lever arm ratios without effecting relative movement between said elements.

6. In a threading machine, a head body; a plurality of cutters mounted for inward and outward movement on said body, a plunger carried by said body and adapted to undergo longitudinal movement and control of said cutters; a sleeve mounted for longitudinal movement on said body but normally held against movement during thread cutting; a collar mounted for longitudinal movement on said body and adapted to undergo movement in accordance with the threading operation; and a lever pivotally mounted on said sleeve and having camming engagement with said plunger and said collar for effecting a controlled retraction of said plunger in response to movement of said collar.

7. The machine defined in claim 6, wherein the pivotal axis of said lever is mounted for adjustment on said sleeve in such direction as to vary the ratio of said lever without producing relative movement of said plunger, sleeve and collar.

8. In a threading machine, a plunger and a sleeve mounted for relative sliding movement and having aligned transverse slots therein; a lever support secured to said sleeve and projecting into said slots; a guideway provided in said support; a slide mounted in said guideway; and means for locking said slide in any one of a plurality of selected adjusted positions in said guideway.

9. The machine defined in claim 8, wherein said last-named means comprises a rotatable member threadedly engaged with said support and said slide.

10. The machine defined in claim 8, wherein said support fits said slots sufficiently tightly to lock said sleeve and plunger against relative rotation.

11. The machine defined in claim 8, wherein said last-named means comprises a wedge-shaped member fitting between said slide and one wall of said guideway, for frictionally locking said slide to said support.

12. The machine defined in claim 8, wherein said last-named means comprises a rotatable member threadedly engaging said support and said slide, one of said threads being of one hand and the other thread being of the opposite hand, thereby providing a quick acting adjustment.

13. In a threading machine, a lever and support assembly comprising an elongated lever pivoted at one end to a support of less width than said lever, so as to provide slide portions on said lever adjacent the pivot point; and a pair of trunnion members mounted for sliding movement on said slide portions of said lever, said members being so dimensioned as to be slidable into coincidence with the pivot point without interference from said support.

14. In a threading machine, a lever and support assembly, comprising a longitudinally divided, two-part lever secured together by a longitudinal key, a support of less width than said lever, one part of said lever having an integral pin projecting into an opening in one end of said support and the other part of said lever; and means for securing the latter to said pin, whereby a bifurcated ended lever of rigid construction is provided.

15. In a threading machine, a head body having a plurality of inwardly and outwardly movable thread cutters mounted thereon; a longitudinally movable plunger for controlling said cutters; a sleeve mounted for longitudinal movement; resilient means acting directly upon and urging said sleeve in one direction; latch means for holding said sleeve in thread cutting position against the action of said resilient means; a collar mounted for longitudinal movement on said head in accordance with the threading operation; a lever pivotally connected to said sleeve and cooperating in camming engagement with said plunger and collar; and means for automatically tripping said latch after a predetermined length of thread has been cut, for retracting the cutters into non-cutting position.

16. The threading machine defined in claim 15, together with means for restoring said collar to threading position, and means for causing said collar to pick up said sleeve at a predetermined point and restore it to latched condition against the action of said resilient means.

17. In a threading machine, a body having a slot therein, a member mounted for longitudinal sliding movement on said body into covering and uncovering relationship to said slot; and a cover plate slidably mounted on said body and also slidably coacting with said member, and means for causing said cover-plate to automatically move and cover said slot in all shifted positions of said member, in response to movement of the latter.

18. In a threading machine, a head body carrying a plurality of inwardly and outwardly movable thread cutters; a longitudinally movable camming member for controlling said cutters; a connector mounted for longitudinal sliding movement but restrained against rotation; means for securing said member and connector in abutting relationship; a plunger; an adjusting member threadedly engaging said connector and mounted for rotation in said plunger and restrained against axial movement with respect to the latter; and means for rotating said adjusting member so as to bodily adjust said connector and camming member longitudinally with respect to said plunger.

19. The threading machine defined in claim 18, together with a plurality of spaced locking detents for yieldably maintaining said adjusting member in any one of a plurality of adjusted positions.

20. In a threading machine, a head body; a camming member and a plunger mounted for independent longitudinal sliding movement in said body; a connector splined to said plunger; means for securing said connector to said camming member; an adjusting member journalled for rotation in said plunger and threadedly engaging said connector; and means for rotating said adjusting member so as to bodily move said connector and camming member with respect to said plunger.

21. The threading machine defined in claim 20, wherein said means for securing said connector to said plunger comprises an element threadedly secured to said connector and having means restraining it against movement in either direction with respect to said camming member, so that rotation thereof will effect positive actuation of said camming member either toward or away from said plunger.

22. The threading machine defined in claim 20, wherein said adjusting member is provided with peripherally spaced serrations, and a plurality of yieldable plungers cooperating with said serrations in staggered relationship, so that one of them will engage a crest of one serration and another will engage the root of two other adjacent serrations.

23. In a threading machine, a head body carrying inwardly and outwardly movable thread cutters; means for causing said cutters to undergo a predetermined rate of retraction during the threading operation, so as to produce a tapered thread, said means being adjustable so as to prevent the cutters from being retracted during the threading operation, to cause them to cut a non-tapered thread, said means also being adjustable by small increments to vary the rate of taper from zero taper to the largest taper the machine is capable of handling.

24. In a thread cutting machine; a head having a plurality of radially extending guideways therein; a plurality of chasers slidably mounted in said guideways; an axially shiftable control member mounted in said head; a plurality of radial projections on said control member having inclined camming wings thereon; inclined surfaces on said member cooperating with said camming wings to form a plurality of inclined cam grooves; said chasers being provided with projections interlocked with said cam grooves; means for moving said control member forwardly and rearwardly to slide said chasers in said guideways; said movement terminating in each direction with said chaser projections interlocked with said grooves; means for causing an additional forward movement of said control member to release said chaser projections from said grooves; said inclined surfaces being extended rearwardly beyond said radial projections to support said chasers with their projections aligned with said grooves when in released position.

25. In a threading machine, a head body having a longitudinal slot; an actuating mechanism projecting through said slot; a control collar telescoped over said body for longitudinal sliding movement thereon and housing the projecting portion of said actuating mechanism in all shifted positions of said collar; closure means mounted for longitudinal movement relatively to said body and control collar, and abutment means associated with said collar for causing said closure means to slide relatively to said body and cover said slot when said collar is shifted in one direction, said projecting portion of said mechanism being operable to contact said member and effect movement thereof in the opposite direction upon reverse movement of said control collar.

26. In a threading machine, a body having inwardly and outwardly movable chasers thereon; a sleeve resiliently urged in one direction within said body and having latch means for holding it in operative position; a plunger slidable in said sleeve and having cam means for controlling said chasers; a mechanism, including a control lever, for causing said plunger to recede and gradually retract said chasers during thread cutting; means connecting said lever to said sleeve for pivotal movement about an axis located within the curved plane defined by the cylindrical wall of said plunger; means for slidably and pivotally connecting said lever to said plunger within said curved plane thereof; and means for rocking said lever about said pivotal axis.

27. The threading machine defined in claim 26, wherein said means for slidably and pivotally connecting said lever to said plunger is operative to apply forces to said plunger substantially centrally thereof, thereby avoiding any tendency of said plunger to bind.

28. In a threading apparatus, a head body carrying inwardly and outwardly movable cutters; a sleeve mounted for longitudinal movement with respect to said body and normally immovable during thread cutting; a control plunger longitudinally movable with respect to said body and having cam means for controlling said cutters; a transversely disposed lever projecting into said body, sleeve, and plunger; fulcrum means mounting said lever for movement about a pivotal axis on said sleeve; means for pivotally and slidably connecting said lever to said plunger, for causing the latter to recede and retract said cutters when the lever is rocked; and means for adjusting said fulcrum means to bring the pivotal axes of said lever on said sleeve and said plunger at least into coincidence, for maintaining said plunger in fixed axial position when said lever is rocked.

FREDERIC NELL.